(12) United States Patent  
Makimoto et al.

(10) Patent No.: US 7,359,028 B2
(45) Date of Patent: Apr. 15, 2008

(54) METHOD OF MANUFACTURING LIQUID CRYSTAL DISPLAY DEVICE

(75) Inventors: Shota Makimoto, Kawasaki (JP); Hiroyasu Inoue, Kawasaki (JP); Yuichi Inoue, Kawasaki (JP); Satoshi Murata, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 120 days.

(21) Appl. No.: 10/929,160

(22) Filed: Aug. 30, 2004

(65) Prior Publication Data

US 2005/0200800 A1 Sep. 15, 2005

(30) Foreign Application Priority Data

Mar. 11, 2004 (JP) ............................. 2004-069559

(51) Int. Cl.
*G02F 1/13* (2006.01)
(52) U.S. Cl. ..................................................... 349/198
(58) Field of Classification Search ......... 349/198–199
See application file for complete search history.

(56) References Cited

U.S. PATENT DOCUMENTS

| 5,263,888 | A | * | 11/1993 | Ishihara et al. ............... 445/25 |
| 5,629,787 | A | * | 5/1997 | Tsubota et al. ............. 349/153 |
| 6,246,456 | B1 | * | 6/2001 | Inoue et al. .................. 349/86 |
| 6,449,028 | B1 | * | 9/2002 | Grupp et al. ................ 349/191 |
| 2003/0155033 | A1 | * | 8/2003 | Tamai .......................... 141/102 |
| 2004/0233374 | A1 | * | 11/2004 | Yamazaki et al. .......... 349/153 |

FOREIGN PATENT DOCUMENTS

| EP | 0881525 | 12/1998 |
| JP | 07-301787 | 11/1995 |
| JP | 10-010545 | 1/1998 |
| KR | 07-128627 | 5/1995 |
| KR | 10-2002-0034881 | 5/2002 |
| KR | 10-2003-0095809 | 12/2003 |

* cited by examiner

*Primary Examiner*—David Nelms
*Assistant Examiner*—Phu Vu
(74) *Attorney, Agent, or Firm*—Greer, Burns & Crain, Ltd

(57) ABSTRACT

A method of manufacturing a liquid crystal display device having good display quality, includes defoaming a liquid crystal composition having a mixture of liquid crystal and a polymerizable component to be polymerized by light or heat; dropping or transferring the liquid crystal composition onto one substrate; and attaching the one substrate and another substrate together in vacuum, and filling the liquid crystal composition therein by returning vacuum back to the atmospheric pressure. A polymerizing step polymerizes the polymerizable component.

13 Claims, 5 Drawing Sheets

METHOD OF MANUFACTURING LIQUID CRYSTAL DISPLAY DEVICE

BACKGROUND OF THE INVENTION

1. Field of the Invention

This invention relates to a method of manufacturing a liquid crystal display device. More specifically, the invention relates to a method of manufacturing a liquid crystal display device including a vertically aligned liquid crystal having a negative dielectric anisotropy and a polymer polymerized by light or heat for regulating a pre-tilt angle of liquid crystal molecules and a tilting direction thereof when a voltage is applied.

2. Description of Related Art

A conventional liquid crystal display device of the MVA (Multi-domain Vertical Alignment) type (hereinafter referred to as "MVA-LCD") includes liquid crystal of the vertically aligned type having negative dielectric anisotropy, and an alignment regulating structure such as a linear protrusion or a slit formed on the substrate. In the MVA-LCD, alignment of liquid crystal is controlled by the alignment regulating structure in a plurality of directions in a pixel when a voltage is applied without rubbing treatment.

As compared to the liquid crystal display device of the TN (twisted nematic) mode, the MVA-LCD has an advantage of excellent viewing angle characteristics as well as a disadvantage of low white brightness and dark display. The principal cause of this disadvantage stems from the fact that a region on the alignment regulating structure becomes a boundary which divides the alignment of liquid crystal and optically appears to be a dark region decreasing the light transmission factor of the pixels as a whole. To improve this, the gap between the alignment regulating structures may be broadened to a sufficient degree. In this case, however, the alignment regulating structure relatively decreases, and an extended period of time is required before the alignment is stabilized, and a response time becomes long.

To realize the MVA-LCD featuring a high brightness and a high response speed, there has been proposed a method of regulating a pre-tilt angle of the liquid crystal molecules and the tilting direction when a voltage is applied by using a polymer. According to this method, a liquid crystal composition which is a mixture of liquid crystal and a monomer (polymerizable component) to be polymerized by light or heat, is sealed between two substrates. A predetermined voltage is applied between the substrates, the liquid crystal layer is irradiated with a UV ray in a state where the liquid crystal molecules are tilted and are aligned in a predetermined direction, and the monomer is polymerized to form a polymer. Due to the polymer formed near the surfaces, the direction of alignment of liquid crystal molecules and the pre-tilt angle thereof are regulated even after the voltage is no longer applied. By regulating the direction of alignment of liquid crystal molecules and the pre-tilt angle thereof by the polymer, there is obtained an MVA-LCD featuring a high brightness and a high response speed.

In recent years, further, attention has been given to a drop-injection method (One Drop Filling method) by which the substrates are attached together and, at the same time, liquid crystal is filled. According to the drop-injection method, a sealing material is, first, applied along the periphery of one substrate like a frame. Next, a predetermined amount of liquid crystal is dropped onto, for example, the other substrate. In this case, the liquid crystals are dropped onto a plurality of places on the substrate by using a dispenser. Next, the two substrates are attached together in vacuum, and the pressure is returned back to the atmospheric pressure, so that the liquid crystal is filled into between the two substrates. Use of the drop-injection method makes it possible to greatly shorten the time for injecting the liquid crystal and to simplify the steps for manufacturing the liquid crystal display device.

However, when the drop-injection method is employed to manufacture the MVA-LCD having a polymer to regulate a pre-tilt angle of liquid crystal molecules and a tilting direction thereof when a voltage is applied, it is difficult to obtain good display quality because bright dots are often seen continuing like circles along the outer peripheries of the portions where the liquid crystal composition is dropped.

SUMMARY OF THE INVENTION

It is an object of this invention to provide a method of manufacturing a liquid crystal display device featuring a favorable display quality.

The above object is accomplished by a method of manufacturing a liquid crystal display device, comprising:

a first step of defoaming a liquid crystal composition having a mixture of liquid crystal and a polymerizable component to be polymerized by light or heat;

a second step of dropping or transferring the liquid crystal composition onto one substrate;

a third step of attaching the one substrate and the other substrate together in vacuum, and filling the liquid crystal composition therein by returning vacuum back to the atmospheric pressure; and a fourth step of polymerizing the polymerizable component.

According to this invention, there is realized a liquid crystal display device featuring a good display quality.

DESCRIPTION OF THE PREFERRED EMBODIMENTS

First Embodiment

A method of manufacturing a liquid crystal display device according to a first embodiment of the invention will now be described with reference to FIG. 1A to FIG. 4. In an MVA-LCD which regulates a direction of alignment of liquid crystal molecules and a pre-tilt angle thereof by a polymer, bright dots are seen continuing like circles along the outer peripheries of portions where a liquid crystal composition is dropped presumably due to that a monomer is precipitated on the outer peripheries of the above portions disturbing the alignment of the liquid crystal. The monomer precipitates since presumably the liquid crystal composition is foamed in vacuum at the time when the substrates are attached together causing the monomer concentration to become non-homogeneous. In this embodiment, therefore, the air and low-boiling substances dissolved in the liquid crystal composition are removed, and the liquid crystal composition is suppressed from foaming in vacuum thereby to prevent the precipitation of the monomer.

Figure 1A:
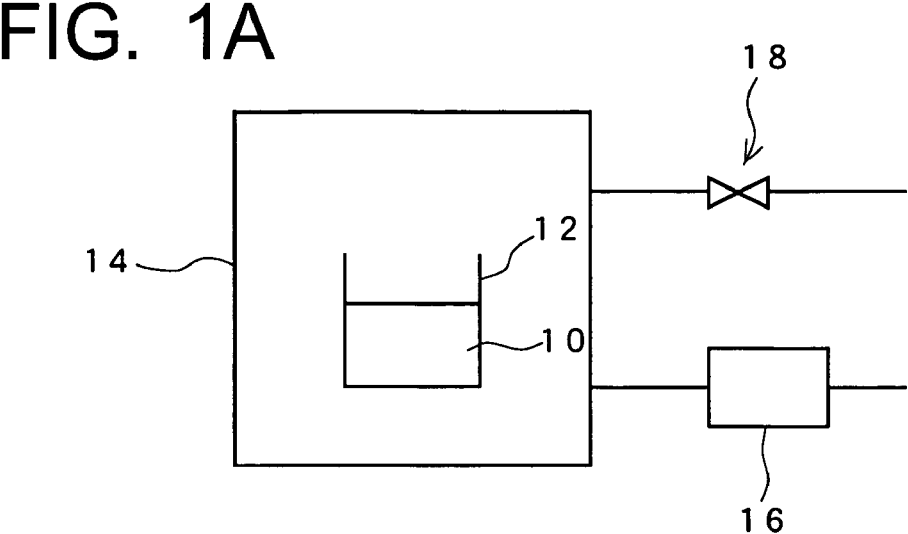
FIGS. 1A to 1C are views schematically illustrating a method of manufacturing a liquid crystal display device according to a first embodiment of this invention.
Figure 1B:
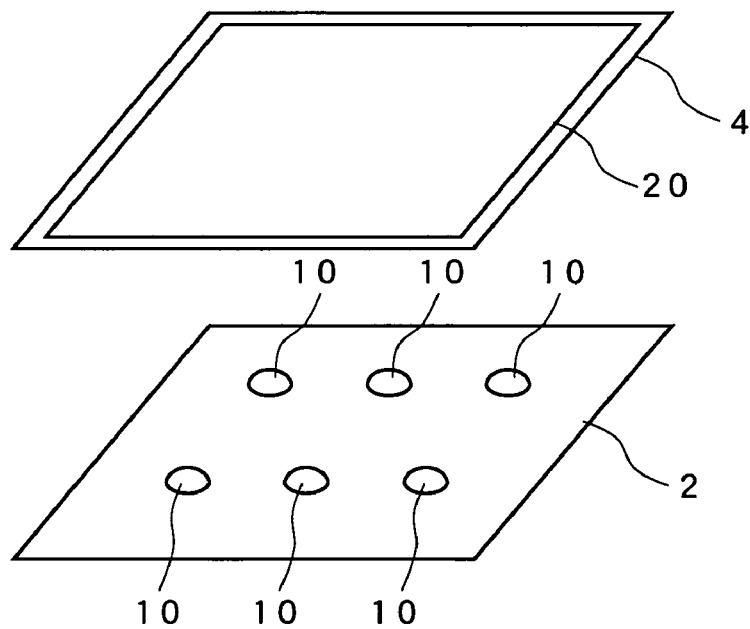
Figure 1C:
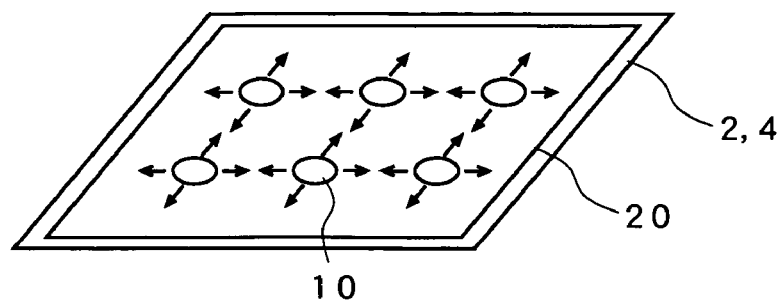
Figure 2:
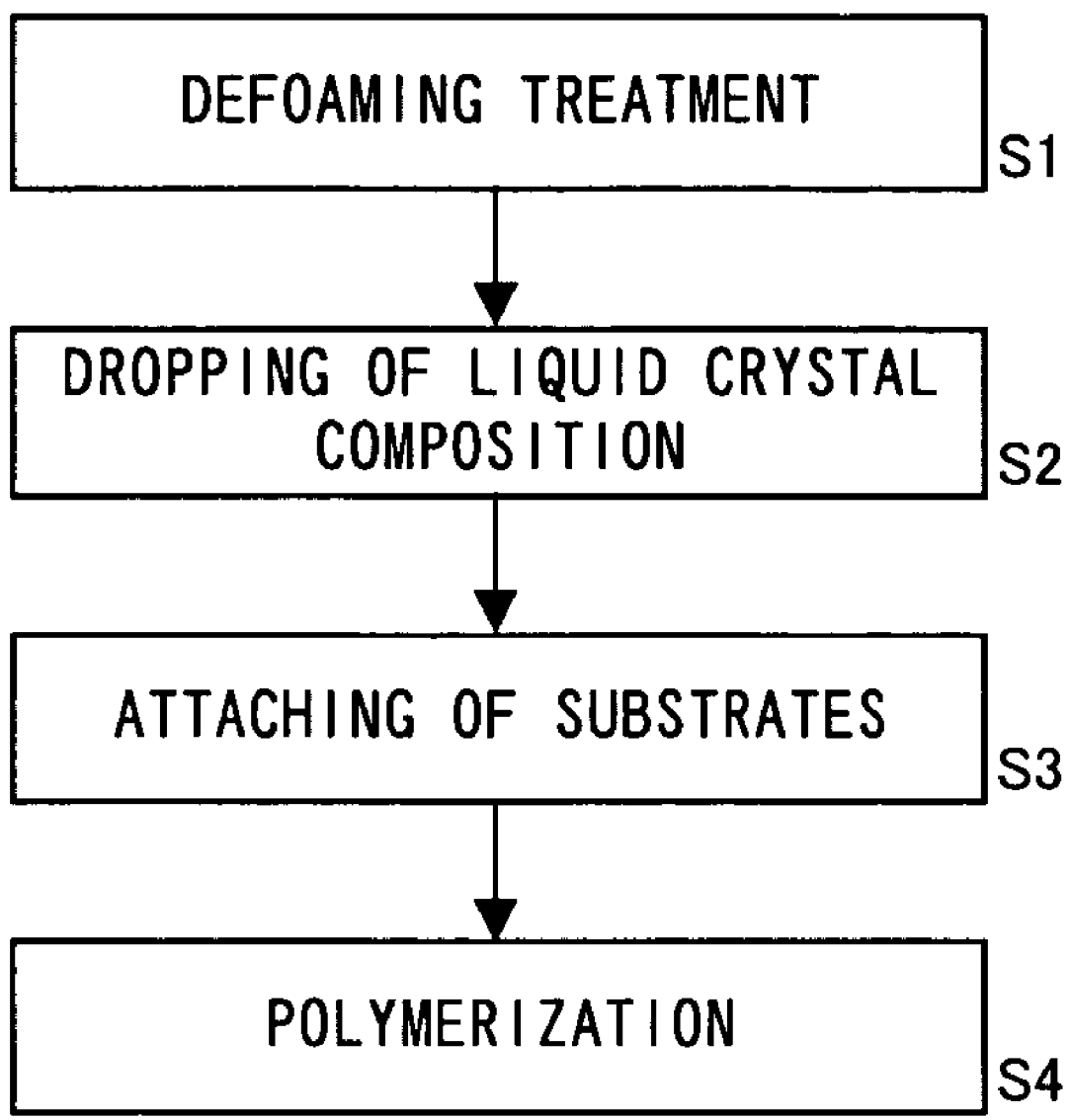
FIG. 2 is a flowchart illustrating a method of manufacturing a liquid crystal display device according to the first embodiment of this invention.

FIGS. 1A to 1C are views schematically illustrating a method of manufacturing the liquid crystal display device according to the embodiment, and FIG. 2 is a flowchart illustrating the method of manufacturing the liquid crystal display device according to the embodiment. First, there are fabricated a TFT substrate including thin film transistors (TFTS), pixel electrodes, gate bus lines and drain bus lines formed on a glass substrate, and an opposite substrate including color filters (CFs) and common electrodes formed on a glass substrate, through predetermined steps.

Next, referring to FIG. 1A, a liquid composition 10 is introduced into a predetermined container 12 and is disposed in a vacuum chamber 14. The liquid crystal composition 10 is obtained by blending a negative-type liquid crystal (produced by Merck Co.) having negative dielectric anisotropy with 0.3% by weight of an acrylic polymerizable component (produced by Merck Co.) that exhibits nematic liquid crystalline property and can be polymerized by light (or heat). Then, by using a vacuum pump 16, the atmosphere surrounding the liquid crystal composition 10 in the vacuum chamber 14 is decreased down to $1 \times 10^{-2}$ Torr (1 Torr=133.322 Pa) or a pressure (vacuum degree) lower than that to conduct the defoaming (de-aerating) treatment for removing the air and low-boiling substances dissolved in the liquid crystal composition 10 (step S1 in FIG. 2). After the end of the defoaming treatment, an inert gas is introduced into the vacuum chamber 14 by using a gas introduction system 18 to return the pressure back to the atmospheric pressure, and the container 12 containing the liquid crystal composition 10 is taken out.

Figure 3:
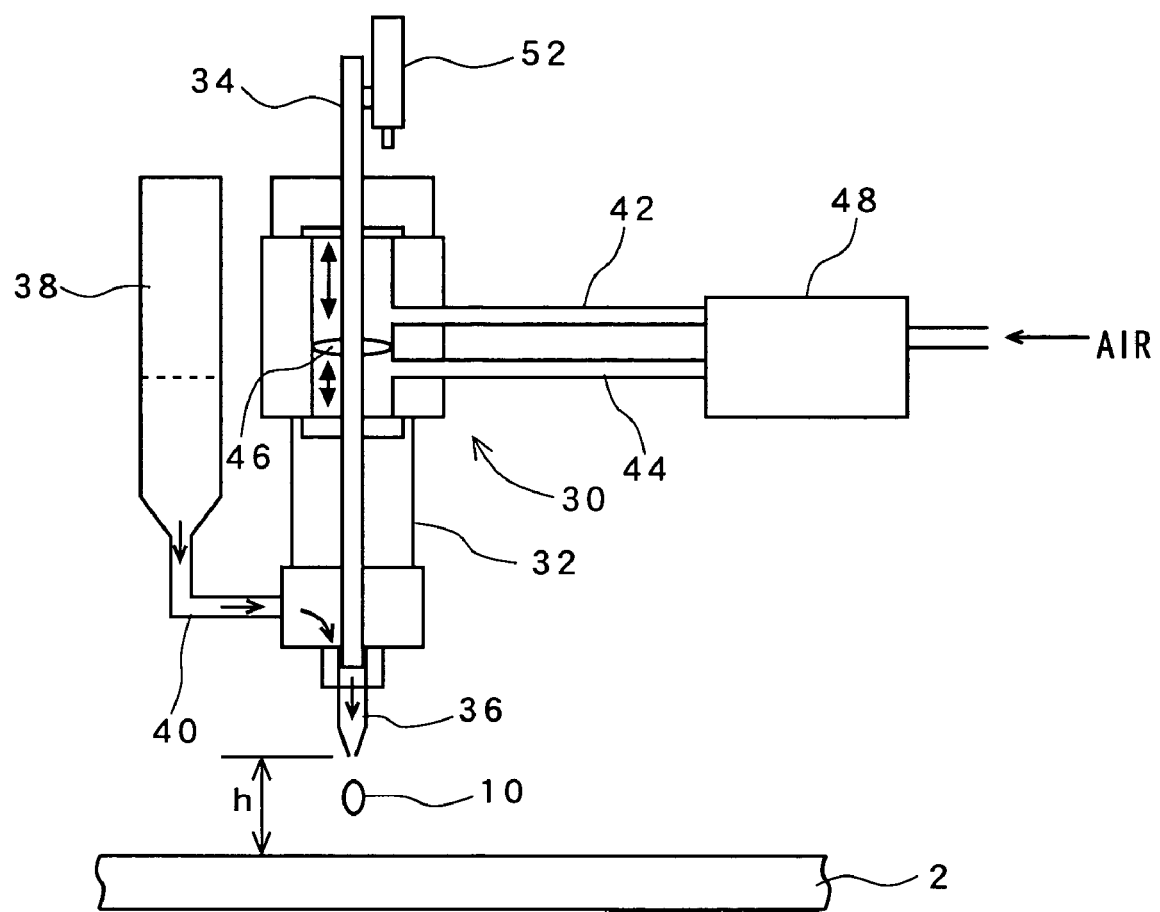
FIG. 3 is a view illustrating the constitution of a dispenser for dropping a liquid crystal composition.

Referring next to FIG. 1B, the liquid crystal composition 10 subjected to the defoaming treatment is dropped onto the TFT substrate 2 (or onto the opposite substrate 4) under the atmospheric pressure (step S2). FIG. 3 illustrates the constitution of a dispenser used for dropping the liquid crystal composition. Referring to FIG. 3, the dispenser 30 of the type of a plunger pump has a housing 32 of a hollow cylindrical shape and is used with the center axis of the cylinder being directed nearly in the vertical direction. A slender rod-like piston 34 is supported in the housing 32 to as to move in the vertical direction along the center axis of the cylinder. The end of the piston 34 moves inside a nozzle 36 provided near the lower end of the housing 32 in the vertical direction. The liquid crystal composition in a liquid crystal composition container 38 flows into the nozzle 36 along the arrows that are shown through a feed pipe 40 and through an opening in the side wall of the housing 32 near the nozzle 36. The liquid crystal composition that has reached the inside of the nozzle 36 drops from the nozzle 36 depending upon the moving amount of the end of the piston 34 in the nozzle 36. Unless an external force is received, the liquid crystal composition is not blown out from the nozzle 36 owing to the surface tension of the liquid crystal composition itself.

In the side wall of the air chamber in the housing 32, two air flow-in ports 42 and 44 are formed being separated apart from each other in the vertical direction. A partitioning wall 46 is secured to the piston 34 to separate the interior of the air chamber into two. The partitioning wall 46 slides together with the piston 34 on the inner wall of the air chamber between the air flow-in ports 42 and 44. Therefore, when the air flows into the air chamber through the air flow-in port 42, the partitioning wall 46 receives the pressure downward in the vertical direction and, hence, moves downward. When the air flows into the air chamber through the air flow-in port 44, the partitioning wall 46 receives the pressure upward in the vertical direction, and moves upward. Thus, the piston 34 is moved in the vertical direction by a predetermined amount.

The air flow-in ports 42 and 44 are connected to a pump controller 48. The pump controller 48 sucks the air and feeds the air to either air flow-in port 42 or 44 at a predetermined timing. The dispenser 30 constituted as described above works to drop, for example, 5 mg of the liquid crystal composition 10 per a shot. The dropping amount per a shot is adjusted by using a micro-gauge 52 secured to the piston 34 protruded upward beyond the housing 32 by controlling the moving amount of the piston 34 in the vertical direction.

In this step, the liquid composition 10 is dropped from a position of a height which is not larger than, for example, 20 mm above the surface of the substrate in order to prevent the air and the like from being dissolved again in the liquid crystal composition 10 which has been defoamed. Namely, in this embodiment, the height h of the end of the nozzle 36 is not larger than 20 mm above the surface of the TFT substrate 2 (or the opposite substrate 4) (h≦20 (mm)). The liquid crystal composition 10 may be transferred onto the substrate instead of employing the step of dropping the liquid crystal composition 10.

Figure 4:
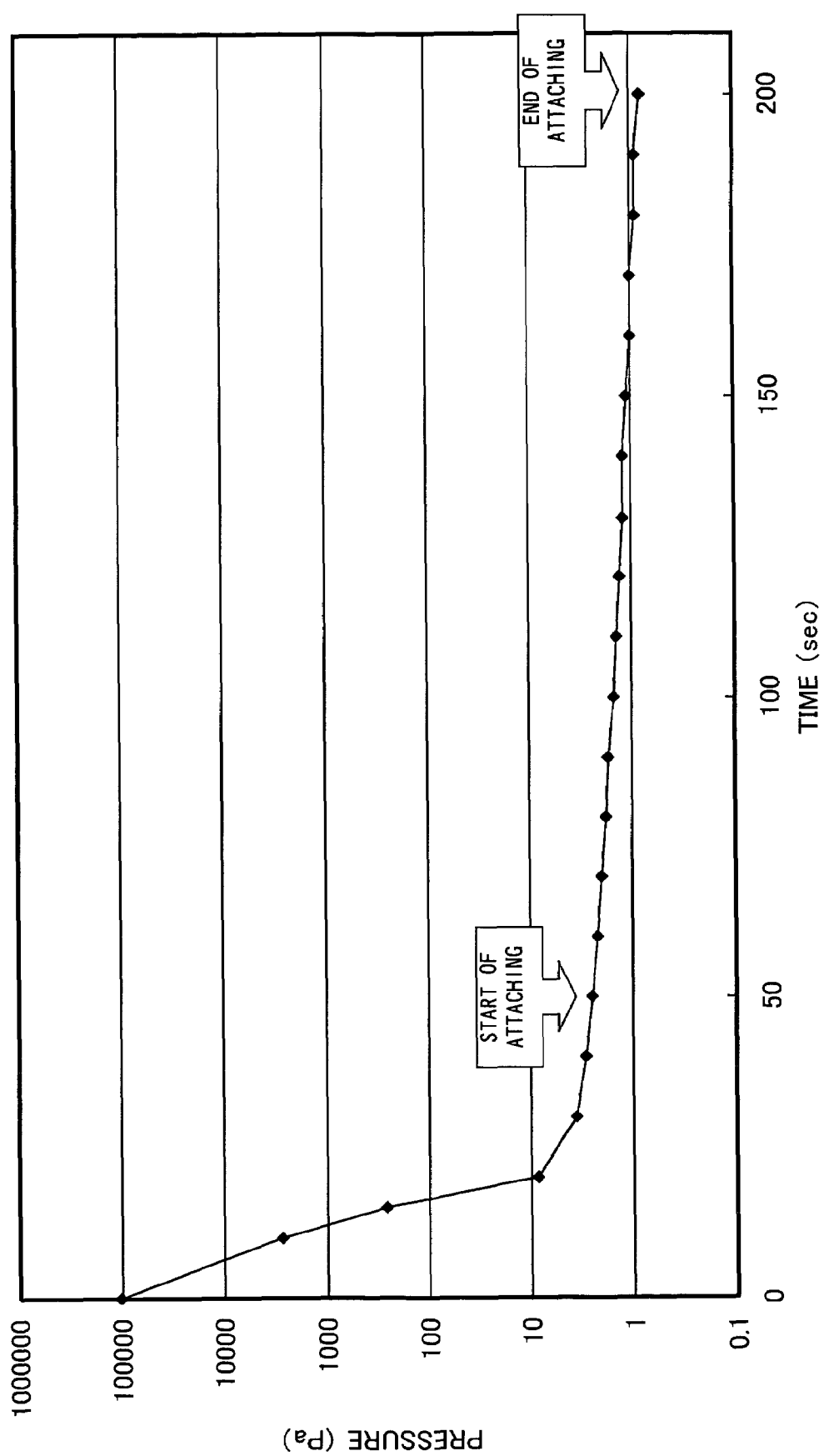
FIG. 4 is a graph illustrating a change in the pressure with the passage of time in a step of attaching the substrates together.

Reverting to FIG. 1B, the TFT substrate 2 onto which the liquid crystal composition 10 has been dropped and the opposite substrate 4 onto which the sealing material 20 has been applied along the outer peripheral portion thereof without cut, are attached together in vacuum by using a vacuum attaching device (step S3). FIG. 4 is a graph illustrating a change in the pressure in the vacuum attaching device with the passage of time in the step of attaching the substrates, wherein the abscissa represents the passage of time (sec) from the start of decreasing the pressure in the vacuum attaching device and the ordinate is a logarithmic representation of the pressure (Pa) in the vacuum attaching device. Referring to FIG. 4, the two substrates 2 and 4 start attaching together after about 50 seconds have passed from when the pressure starts decreasing. In this case, the pressure in the vacuum attaching device is about 2.5 Pa ($\cong 1.9 \times 10^{-2}$ Torr). Attaching of the two substrates 2 and 4 ends after about 200 seconds have passed from when the pressure was decreased (after about 150 seconds from the start of attaching). At this moment, the pressure in the vacuum attaching device is about 0.8 Pa ($\cong 6 \times 10^{-3}$ Torr). Thereafter, the inert gas is introduced into the vacuum attaching device to return the atmosphere surrounding the substrates 2 and 4 back to the atmospheric pressure in about 5 seconds, and the liquid crystal composition 10 between the two substrates 2 and 4 diffuses as illustrated in FIG. 1C. Then, the sealing material 20 is cured to complete the attaching of the substrates and the filling of the liquid crystal.

Next, a predetermined voltage is applied between the substrates 2 and 4, the liquid crystal composition 10 is irradiated with a UV beam (or the liquid crystal composition 10 is heated) in a state where the liquid crystal molecules have been tilted and aligned to polymerize the monomer in the liquid crystal composition 10 and to form a polymer (step S4). Due to the polymer formed near the surfaces of the substrates 2 and 4, the direction of alignment and the pre-tilt angle of the liquid crystal molecules are regulated even after the voltage has no longer been applied. The liquid crystal display device is completed through the above-mentioned steps.

In this embodiment, the liquid crystal composition 10 is defoamed before being dropped onto the TFT substrate 2. In the step of attaching the substrates, therefore, the liquid crystal composition 10 is not foamed, the monomer concentration does not become non-uniform in the liquid crystal composition 10, and the precipitation of monomer is suppressed. According to this embodiment, therefore, bright dots due to defective alignment of liquid crystal are not seen, and there is realized a liquid crystal display device featuring favorable display quality.

Second Embodiment

Figure 5:
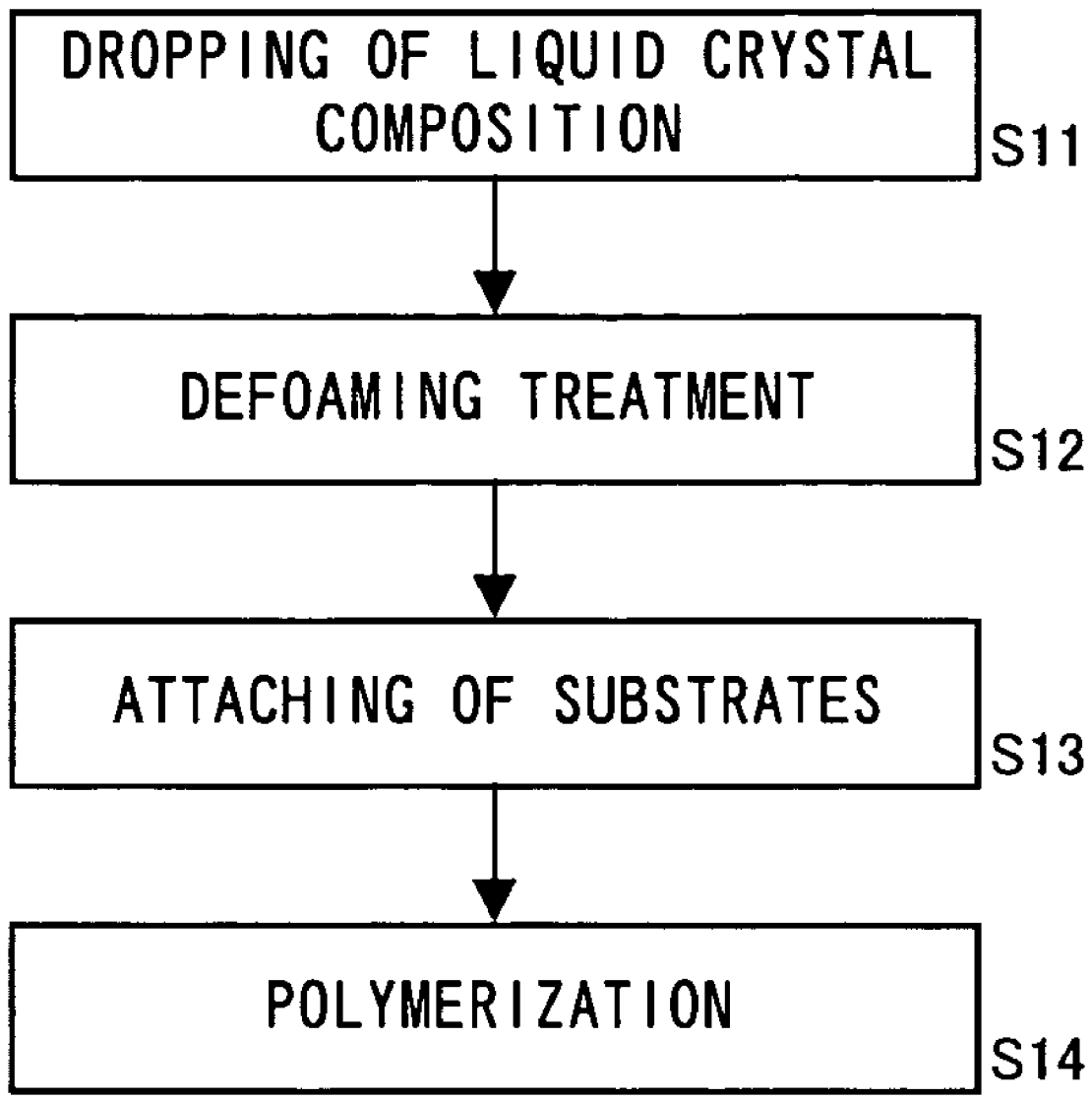
FIG. 5 is a flowchart illustrating a method of manufacturing a liquid crystal display device according to a second embodiment of this invention.

Next, the method of manufacturing the liquid crystal display device according to a second embodiment of the invention will be described with reference to FIG. 5 which is a flowchart illustrating the method of manufacturing the liquid crystal display device according to the embodiment. Unlike the first embodiment, in this embodiment as illustrated in FIG. 5, the liquid crystal composition 10 that has not been defoamed is dropped or transferred onto the TFT substrate 2 (or onto the opposite substrate 4) in the atmosphere (step S11). The liquid crystal composition 10 is produced by blending a negative-type liquid crystal having negative dielectric anisotropy (produced by Merck Co.) with 0.3% by weight of an acrylic polymerizable component (produced by Merck Co.) that exhibits nematic liquid crystalline property and can be polymerized by light (or heat).

Next, the TFT substrate 2 onto which the liquid crystal composition 10 has been dropped and the opposite substrate 4 onto which the sealing material 20 has been applied along the outer peripheral portion thereof without cut, are arranged in, for example, the vacuum attaching device. Then, the atmosphere surrounding the liquid crystal composition 10 in the vacuum attaching device is decreased down to $1 \times 10^{-2}$ Torr or lower to remove by defoaming the air and low-boiling substances dissolved in the liquid crystal composition 10 (step S12). At this moment, the liquid crystal composition 10 foams in the reduced-pressure atmosphere, and the monomer concentration is becoming non-uniform. Thereafter, the inert gas is introduced into the vacuum attaching device to return the pressure in the vacuum attaching device back to near the atmospheric pressure. Then, the monomer concentration becomes uniform in the liquid crystal composition 10. Here, the treatment for defoaming the liquid crystal composition 10 may be conducted by using any vacuum chamber other than the vacuum attaching device.

Next, the two substrates 2 and 4 are attached together while decreasing again the pressure in the vacuum attaching device (step S13). At this moment, the liquid crystal composition 10 that has already been defoamed never foams. Thereafter, the inert gas or the like gas is introduced into the vacuum attaching device to return the atmosphere surrounding the substrate 2 and 4 back to the atmospheric pressure, so that the liquid crystal composition 10 diffuses between the two substrates 2 and 4. Then, the sealing material 20 is cured to complete the attaching of the substrates and the filling of the liquid crystal.

Next, a predetermined voltage is applied between the substrates 2 and 4, the liquid crystal composition 10 is irradiated with a UV beam (or the liquid crystal composition 10 is heated) in a state where the liquid crystal molecules have been tilted and aligned to polymerize the monomer in the liquid crystal composition 10 and to form a polymer (step S14). Due to the polymer formed near the surfaces of the substrates 2 and 4, the direction of alignment and the pre-tilt angle of the liquid crystal molecules are regulated even after the voltage has no longer been applied. The liquid crystal display device is completed through the above-mentioned steps.

In this embodiment, the pressure in the vacuum attaching device is decreased to defoam the liquid crystal composition 10 and, then, the pressure in the vacuum attaching device is returned back to near the atmospheric pressure to uniform the monomer concentration in the liquid crystal composition 10. Therefore, the liquid crystal composition 10 does not foam in the step of attaching the substrates, and the monomer concentration does not become non-uniform in the liquid crystal composition 10, suppressing the precipitation of monomer. According to this embodiment, therefore, bright dots due to defective alignment of liquid crystal are not seen, and there is realized a liquid crystal display device featuring favorable display quality.

Third Embodiment

Next, the method of manufacturing the liquid crystal display device according to a third embodiment of the invention will be described with reference to FIG. 5. In this embodiment like in the second embodiment, the liquid crystal composition 10 that has not been defoamed is dropped or transferred onto the TFT substrate 2 (or onto the opposite substrate 4) in the atmosphere (step S11 in FIG. 5). The liquid crystal composition 10 is produced by blending a negative-type liquid crystal having negative dielectric anisotropy (produced by Merck Co.) with 0.3% by weight of an acrylic polymerizable component (produced by Merck Co.) that exhibits nematic liquid crystalline property and can be polymerized by light (or heat).

Next, the TFT substrate 2 onto which the liquid crystal composition 10 has been dropped (and the liquid crystal composition 10) are heated at 80° C. for 5 minutes to effect the defoaming treatment (step S12 in FIG. 5). The gas dissolves less in the liquid crystal composition 10 at high temperature than at normal temperature. Therefore, the air and the low-boiling substances are removed from the liquid crystal composition 10 that is heated. In this step, the monomer concentration does not become non-uniform.

Next, the TFT substrate 2 and the opposite substrate 4 onto which the sealing material 20 has been applied along the outer peripheral portion thereof without cut, are arranged in the vacuum attaching device. Then, the two substrates 2 and 4 are attached together while decreasing the pressure in the vacuum attaching device (step S13 in FIG. 5). Thereafter, the inert gas is introduced into the vacuum attaching device to return the pressure therein back to the atmospheric pressure, and the liquid crystal composition 10 diffuses between the two substrates 2 and 4. Then, the sealing material 20 is cured to complete the attaching of the substrates and the filling of the liquid crystal.

Next, a predetermined voltage is applied between the substrates 2 and 4, the liquid crystal composition 10 is irradiated with a UV beam (or the liquid crystal composition 10 is heated) in a state where the liquid crystal molecules have been tilted and aligned to polymerize the monomer in the liquid crystal composition 10 and to form a polymer (step S14 in FIG. 5). Due to the polymer formed near the surfaces of the substrates 2 and 4, the direction of alignment and the pre-tilt angle of the liquid crystal molecules are regulated even after the voltage has no longer been applied. The liquid crystal display device is completed through the above-mentioned steps.

In this embodiment, the TFT substrate 2 onto which the liquid crystal composition 10 has been dropped is heated to effect the defoaming treatment. Therefore, the liquid crystal composition 10 does not foam in the step of attaching the substrates, and the monomer concentration does not become non-uniform in the liquid crystal composition 10, suppressing the precipitation of monomer. According to this embodiment, therefore, bright dots due to defective alignment of liquid crystal are not seen, and there is realized a liquid crystal display device featuring favorable display quality.

Here, six liquid crystal display devices were manufactured relying upon the same manufacturing method as those described above with the exception of heating the TFT substrates 2 at 40° C., 45° C., 50° C., 55° C., 60° C. and 70° C., respectively, in the defoaming treatment. The liquid crystal display devices manufactured by heating the TFT substrates 2 at 50° C., 55° C., 60° C. and 70° C. in the defoaming treatment exhibited favorable display qualities like those described above. The liquid crystal display devices manufactured by heating the TFT substrates 2 at 40° C. and 45° C. in the defoaming treatment permitted bright dots to appear continuing circularly along the outer peripheries of the portions where the liquid crystal composition 10 was dropped, and good display quality was not obtained. By heating the TFT substrate 2 at 50° C. or higher in the defoaming treatment, as described above, there is obtained a liquid crystal display device having a good display quality. The liquid crystal composition 10 used in this embodiment has a heat resistance temperature of 150° C. In practice, therefore, the TFT substrate is heated at not lower than 50° C. but not higher than 150° C.

Fourth Embodiment

Next, the method of manufacturing the liquid crystal display device according to a fourth embodiment of the invention will be described. In this embodiment like in the second embodiment, the liquid crystal composition 10 that has not been defoamed is dropped or transferred onto the TFT substrate 2 (or onto the opposite substrate 4) in the atmosphere. The liquid crystal composition 10 is produced by blending a negative-type liquid crystal having negative dielectric anisotropy (produced by Merck Co.) with 0.3% by weight of an acrylic polymerizable component (produced by Merck Co.) that exhibits nematic liquid crystalline property and can be polymerized by light (or heat).

Next, the TFT substrate 2 and the opposite substrate 4 onto which the sealing material 20 has been applied along the outer peripheral portion thereof without cut, are arranged in the vacuum attaching device. Then, the substrates 2 and 4 are attached together while decreasing the pressure in the vacuum attaching device. In this embodiment, the substrates 2 and 4 starts attaching when the pressure in the vacuum attaching device becomes about 1 Torr (=133.322 Pa). At this moment, the atmosphere surrounding the liquid crystal composition 10 is a vacuum of a relatively low degree, and the liquid crystal composition 10 does not foam. After the passage of a predetermined period of time while decreasing the pressure, the attaching of the two substrates 2 and 4 is finished. Thereafter, an inert gas is introduced into the vacuum attaching device to return the pressure therein back to the atmospheric pressure, and the liquid crystal composition 10 diffuses between the two substrates 2 and 4. Then, the sealing material 20 is cured to complete the attaching of the substrates and the filling of the liquid crystal.

Next, a predetermined voltage is applied between the substrates 2 and 4, the liquid crystal composition 10 is irradiated with a UV beam (or the liquid crystal composition 10 is heated) in a state where the liquid crystal molecules have been tilted and aligned to polymerize the monomer in the liquid crystal composition 10 and to form a polymer. Due to the polymer formed near the surfaces of the substrates 2 and 4, the direction of alignment and the pre-tilt angle of the liquid crystal molecules are regulated even after the voltage has no longer been applied. The liquid crystal display device is completed through the above-mentioned steps.

In this embodiment, the substrates 2 and 4 start attaching in a vacuum of a relatively low degree. In the step of attaching the substrates, therefore, the liquid crystal composition 10 does not foam, and the monomer concentration in the liquid crystal composition 10 does not become non-uniform, making it possible to suppress the precipitation of monomer. In this embodiment, therefore, bright dots due to defective alignment of liquid crystal are not seen, and there is realized a liquid crystal display device featuring favorable display quality.

Here, a plurality of liquid crystal display devices were manufactured relying upon the same manufacturing method as the one described above but varying the pressure in the vacuum attaching device at the start of attaching the substrates. Bright dots develop less in the liquid crystal display devices when the attaching of the substrates start in a state where the pressure is high in the vacuum attaching device. No bright dot was seen in the liquid crystal display device when the attaching of the substrates was started in a state where the pressure in the vacuum attaching device was not lower than 1 Torr. By starting the attaching of the substrates 2 and 4 in vacuum of a relatively low degree which is not smaller than 1 Torr (lower than the atmospheric pressure), there is obtained a liquid crystal display device featuring a good display quality.

What is claimed is:

1. A method of manufacturing a liquid crystal display device, comprising:
    a first step of defoaming a liquid crystal composition having a mixture of liquid crystal and a polymerizable component to be polymerized by light or heat;
    a second step of dropping or transferring the liquid crystal composition onto one substrate;
    a third step of attaching the one substrate and a second substrate together in vacuum, and filling the liquid crystal composition therein by returning vacuum back to the atmospheric pressure; and
    a fourth step of polymerizing the polymerizable component and forming a polymer;
    wherein the polymer formed near surfaces of the one and second substrates regulates a direction of alignment and a pre-tilt angle of liquid crystal molecules.

2. A method of manufacturing a liquid crystal display device according to claim 1, wherein the second step is effected after the first step.

3. A method of manufacturing a liquid crystal display device according to claim 2, wherein the defoaming step is effected while decreasing the atmosphere surrounding the liquid crystal composition down to a predetermined pressure.

4. A method of manufacturing a liquid crystal display device according to claim 3, wherein the predetermined pressure is not higher than 1 Torr.

5. A method of manufacturing a liquid crystal display device according to claim 2, wherein in the second step, the liquid crystal composition is dropped from a height of not larger than 20 mm above the one substrate.

6. A method of manufacturing a liquid crystal display device according to claim 1, wherein the first step is effected after the second step.

7. A method of manufacturing a liquid crystal display device according to claim 6, wherein the first step effects the defoaming treatment while decreasing the atmosphere surrounding the liquid crystal composition down to a predetermined pressure, and a step is interposed between the first step and the third step for returning the atmosphere surrounding the liquid crystal composition back to near the atmospheric pressure.

8. A method of manufacturing a liquid crystal display device according to claim 7, wherein the predetermined pressure is not higher than 1 Torr.

9. A method of manufacturing a liquid crystal display device according to claim 6, wherein the first step effects the defoaming treatment while heating the liquid crystal composition at a predetermined temperature.

10. A method of manufacturing a liquid crystal display device according to claim 9, wherein the predetermined temperature is not lower than 50° C.

11. A method of manufacturing a liquid crystal display device according to claim 9, wherein the predetermined temperature is not higher than 150° C.

12. A method of manufacturing a liquid crystal display device, comprising:

a first step of dropping or transferring a liquid crystal composition having a mixture of liquid crystal and a polymerizable component to be polymerized by light or heat onto one substrate;

a second step of attaching the one substrate and a second substrate together in an atmosphere of a predetermined pressure in which the liquid crystal composition does not foam, and filling the liquid crystal composition therein by returning the pressure back to the atmospheric pressure; and a third step of polymerizing the polymerizable component.

13. A method of manufacturing a liquid crystal display device according to claim 12, wherein the predetermined pressure is not lower than 1 Torr but is lower than the atmospheric pressure.

* * * * *

UNITED STATES PATENT AND TRADEMARK OFFICE
CERTIFICATE OF CORRECTION

PATENT NO. : 7,359,028 B2
APPLICATION NO. : 10/929160
DATED : April 15, 2008
INVENTOR(S) : Makimoto et al.

Page 1 of 1

It is certified that error appears in the above-identified patent and that said Letters Patent is hereby corrected as shown below:

On the Title Page

Item (73) Assignees, delete "Au Optronics Corporation" and insert

--AU Optronics Corporation--.

Item (56) References Cited, Foreign Patent Documents, delete

"KR 07-128627 5/1995" and insert --JP 07-128627 5/1995--.

Signed and Sealed this

Nineteenth Day of August, 2008

JON W. DUDAS
*Director of the United States Patent and Trademark Office*